(12) United States Patent
Baten et al.

(10) Patent No.: US 8,542,669 B2
(45) Date of Patent: Sep. 24, 2013

(54) WAVEFORM QUALITY FEEDBACK FOR THE SELECTION OF GATEWAYS

(75) Inventors: Ben Baten, Westminster, CO (US); Wing Fai Lo, Plano, TX (US); Sean S. B. Moore, Hollis, NH (US)

(73) Assignee: Avaya, Inc., Baskiing Ridge, NJ (US)

( * ) Notice: Subject to any disclaimer, the term of this patent is extended or adjusted under 35 U.S.C. 154(b) by 2011 days.

(21) Appl. No.: 11/424,937

(22) Filed: Jun. 19, 2006

(65) Prior Publication Data

US 2007/0291745 A1     Dec. 20, 2007

(51) Int. Cl.
*H04L 12/66*     (2006.01)
(52) U.S. Cl.
USPC .......................................................... 370/352
(58) Field of Classification Search
USPC .......................................................... 370/352
See application file for complete search history.

(56) References Cited

U.S. PATENT DOCUMENTS

| | | | |
|---|---|---|---|
| 6,216,011 | B1 | 4/2001 | Wierzbicki et al. |
| 6,349,136 | B1 | 2/2002 | Light et al. |
| 6,850,525 | B2 * | 2/2005 | Mitsumori et al. ...... 370/395.52 |
| 7,586,852 | B2 * | 9/2009 | Jagadeesan .................... 370/252 |
| 2002/0131604 | A1 * | 9/2002 | Amine ............................ 381/58 |
| 2004/0165570 | A1 * | 8/2004 | Lee ................................ 370/349 |
| 2005/0015253 | A1 * | 1/2005 | Rambo et al. ................. 704/246 |
| 2005/0243811 | A1 * | 11/2005 | Jagadeesan .................... 370/356 |
| 2005/0261860 | A1 * | 11/2005 | Lobig ............................ 702/122 |
| 2007/0183402 | A1 * | 8/2007 | Bennett et al. ................ 370/352 |

OTHER PUBLICATIONS

Shu Tao et al., Improving VoIP Quality Through Path Switching, Dec. 16, 2004.
Voice Quality (VQ) in Converging Telephony and IP Networks, Web ProForum Tutorials, http://www.iec.org, The International Engineering Consortium, 2005.

* cited by examiner

*Primary Examiner* — Luat Phung
*Assistant Examiner* — Najeebuddin Ansari

(57) ABSTRACT

Techniques are disclosed for selecting transmission resources in a telecommunications system that comprises different networks, where the techniques are based on the quality of the waveform of transmitted media such as audio or video signals, in contrast to the quality of service of the network that transports the media. The problem with only using quality of service to determine which resources to allocate to a call is that quality of service does not guarantee that the quality experienced by the call's participants is satisfactory just because a component network's quality of service is satisfactory. For example, the end-to-end delay experienced in a VoIP network might be satisfactory for most data transfers, but might still be inadequate to control the echo experienced by telecommunications users. The disclosed techniques evaluate the waveform quality (i.e., in terms of loudness, noise, echo, and so forth) of media that is transmitted along a path and allocate alternative resources accordingly.

19 Claims, 10 Drawing Sheets

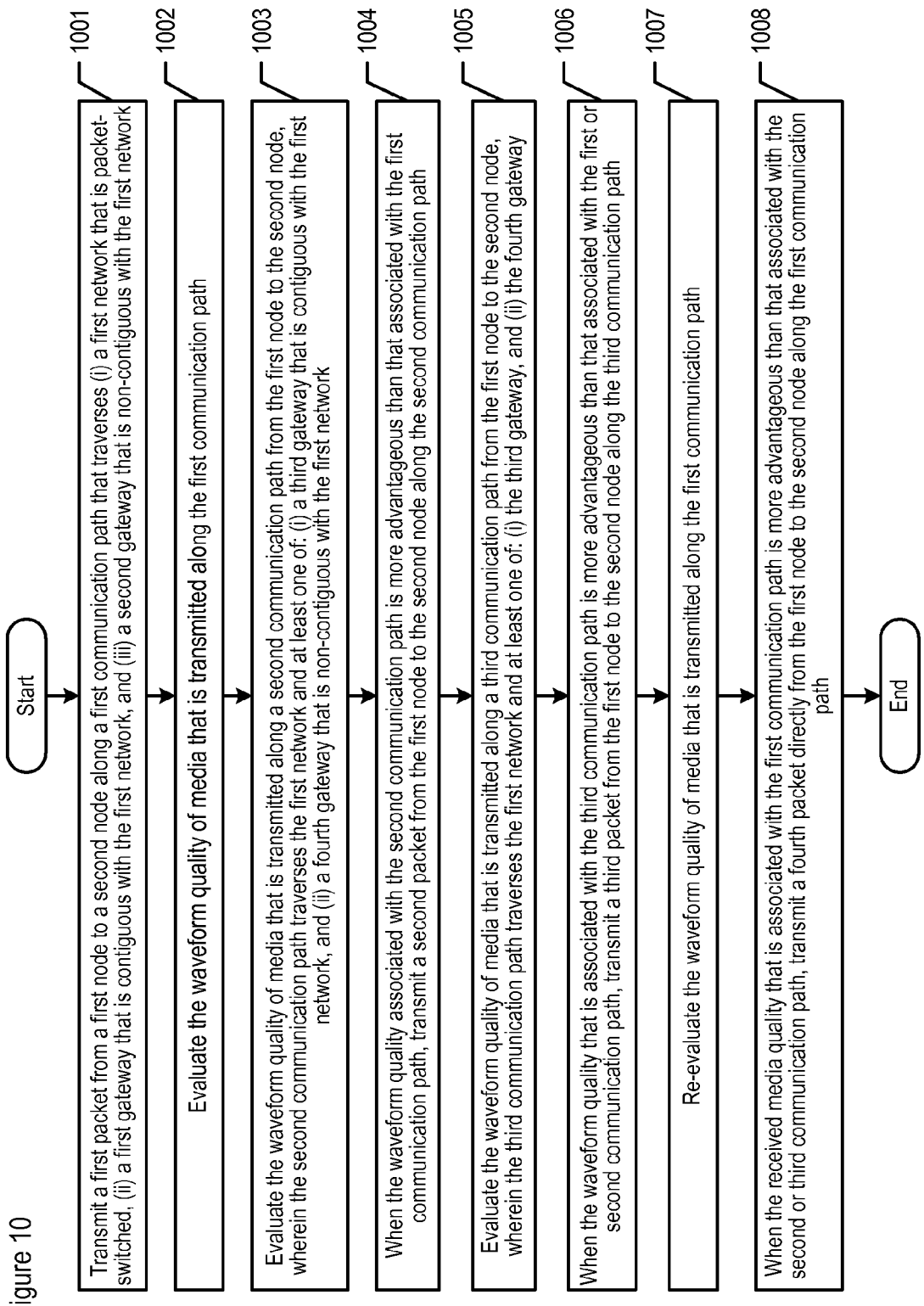

WAVEFORM QUALITY FEEDBACK FOR THE SELECTION OF GATEWAYS

FIELD OF THE INVENTION

The present invention relates to telecommunications in general and, more particularly, to using, for feedback purposes, the waveform quality of media that is transmitted along a path.

BACKGROUND OF THE INVENTION

FIG. 1 depicts a schematic diagram of telecommunications system 100 in the prior art. System 100 comprises telephones 101 and 109, Public Switched Telephone Networks (PSTN) subnetworks 102 and 108, Internet Protocol (IP) gateways 103 and 107, Internet Protocol network 104, and Internet Protocol endpoints 105 and 106, interconnected as shown. System 100 enables telephones 101 and 109 and endpoints 105 and 106, as well as other telecommunications terminals, to communicate with each other various kinds of media such as audio, video, and so forth.

Each of telephones 101 and 109 is a telecommunications terminal that is capable of making calls to or receiving calls from any other telecommunications terminal—PSTN-based or IP-based—in telecommunications system 100.

Public Switched Telephone Network subnetworks 102 and 108 are portions of the Public Switched Telephone Network (PSTN). Subnetwork 102 comprises access paths, switches, and transmission paths, in a combination of analog and digital technology, which enable telephone 101 to communicate with other terminals. Subnetwork 108 also comprises access paths, switches, and transmission paths, in a combination of analog and digital technology, which enable telephone 109 to communicate with other terminals. Each depicted portion of the PSTN might comprise wireline equipment, wireless equipment, or both wireline and wireless equipment.

Internet Protocol gateways 103 and 107 are nodes that act as access points into Internet Protocol network 104 for signals from PSTN subnetworks 102 and 108, respectively.

Each of Internet Protocol endpoints 105 and 106 is a packet-capable telecommunications terminal that communicates via the Internet Protocol. Each endpoint is capable of making calls to or receiving calls from any other telecommunications terminal—PSTN-based or IP-based—in telecommunications system 100.

Internet Protocol network 104 is a packet-switched network that is capable of transporting packets from one node to another. The transported packets can comprise voice or video signal information in their payloads and can also comprise Real-time Transport Protocol (RTP) headers, User Datagram Protocol (UDP) headers, or IP headers. When the packets comprise voice signal information with IP headers, they are often referred to as Voice over Internet Protocol (VoIP) packets, and the networks that transport the VoIP packets are often referred to as VoIP networks. When each node in network 104 can be both a sender of packets and a receiver, there are k*(k−1) network paths through network 104, wherein k is positive integer that represents the number of nodes in the network.

The service provided by a network path in network 104 can be characterized by its "quality of service," which, for the purposes of this specification, is defined as a function of the bandwidth, error rate, and latency from one node to another. For the purposes of this specification, the "bandwidth" from one node to another is defined as an indication of the amount of information per unit time that can be transported from the first node to the second. Typically, bandwidth is measured in bits or bytes per second. The bandwidth exhibited by the network can be compared to the bandwidth requirements of one or more media flows; the "bandwidth requirement" is the amount of information per unit time per media flow that has to be transported from the first node to the second, usually determined by the signal encoding protocol (e.g., G.711 for voice, etc.) that governs the particular media flow. For the purposes of this specification, the "error rate" from one node to another is defined as an indication of the amount of information that is corrupted as it travels from the first node to the second. Typically, error rate is measured in bit errors per number of bits transmitted or in packets lost per number of packets transmitted. For the purposes of this specification, the "latency" from one node to another is defined as an indication of how much time is required to transport information from one node to another, plus any packetization delays and buffering delays that accumulate at the endpoints. Typically, latency is measured in milliseconds. The quality of service provided by network 104 can vary based on the actual bandwidth, error rate, and latency experienced by the call or session that is being carried by network 104, in relation to the requirements for the bandwidth, error rate, and latency for the call or session.

The quality experienced in telecommunications system 100 can also depend on other factors. First, each of telephones 101 and 109 can influence audio call clarity through the quality of its loudspeaker and microphone, the loudness of the transmitted and received signal, and the acoustic echo generated between the loudspeaker and microphone. Second, where each of PSTN subnetworks 102 and 108 converts the analog voice signals from a telephone into digital signals to yield greater efficiency in the transmission backbone, digitizing those voice signals can affect the clarity. Third, each of gateways 103 and 107 can affect the clarity through its components such as speech codecs, silence suppression mechanisms, comfort noise generators, jitter buffers, and echo cancellers. And fourth, each of endpoints 105 and 106 also can affect the clarity through its components such as a speech codec, a silence suppression mechanism, and the quality of its loudspeaker and microphone. Many of the impairments that are presently experienced by telecommunications users are as the result of different networks, such as Voice over Internet Protocol networks versus the PSTN, having to interoperate with each other, where some of those networks—or at least the commercial application of those networks—are relatively new in telecommunications. Both the differences between the networks and the equipment that is necessary to enable the different networks to interoperate, such as gateways, are some of the causes of impairments, many of which were either imperceptible or nonexistent in a PSTN-only telecommunications environment.

Other configurations of "hybrid" telecommunications systems that comprise both PSTN and IP-based networks also exist in the prior art. In those other systems, as in the telecommunications system described above and with respect to FIG. 1, both the PSTN and the gateways that bridge the PSTN and IP-based networks can be sources of impairments.

SUMMARY OF THE INVENTION

The present invention is a technique for selecting transmission resources in a telecommunications system that comprises multiple, different networks, where the technique is based on the quality of the waveform of transmitted media such as audio or video signals, in contrast to the quality of service (i.e., the bandwidth, error rate, or latency) of the network that transports the media. The problem with only using quality of service to determine which resources to allocate to a call is that quality of service does not guarantee that the quality experienced by the call's participants is satisfactory just because a component network's quality of service is satisfactory. For example, in a Voice over Internet Protocol (VoIP) network that is part of the broader, hybrid telecommunications system, the quality of service-based metric of end-to-end delay might be satisfactory for most data transfers, but might still be inadequate for controlling the echo that is experienced by end users across the overall telecommunications system. The present invention recognizes the limitations of only using quality of service and attempts to provide an improvement in the quality perceived by users, without some of the costs and disadvantages for doing so in the prior art.

The techniques of the illustrative embodiments attempt to provide an improvement in the quality as evaluated at the waveform level—rather than merely at the packet level as is done to determine quality of service—for media that is transmitted along a path. Waveform quality is evaluated in terms of one or more of loudness, distortion, noise, fading, crosstalk, echo, and so forth. The techniques seek to improve the waveform quality of media that is transmitted along a path (i) by periodically or sporadically evaluating alternative routes and (ii) by sending one or more packets through evaluated routes that will result in, or are believed will result in, an acceptable waveform quality for the call or session. Some embodiments of the present invention are particularly well-suited for applications that are sensitive to waveform quality issues, such as the provisioning of telephony and streaming audio and video over multiple, different networks, including Internet Protocol networks (e.g., VoIP networks, etc.) that have to co-exist and interoperate with the Public Switched Telephone Network, as part of a hybrid telecommunications system.

In accordance with the first of two illustrative embodiments of the present invention, the sending node at the edge of an Internet Protocol network—or some agent acting on behalf of the sending node—exercises the capability to either:
  i. transmit a packet "directly," in which case the packet will traverse the network on a "nominal" path in well-known fashion, or
  ii. transmit the packet "indirectly," in which case the packet will be sent to a relay node, which forwards the packet to the receiving node on the other end of the IP network, which receiving node then forwards the media signals represented in the packet to the destination node of the call or session.

When the sending node or agent has the option of sending the packet either (i) directly or (ii) through one or more indirect paths, the sending node or agent can evaluate the waveform quality that is associated with multiple paths between the sending node and the receiving node, and can then intentionally choose a path for the packet that is advantageous. In some embodiments, the sending node or agent also has the option of sending the packet through an alternative network, such as one that has been conditioned to provide optimum waveform quality. The result is that by giving the sending node more than one option for routing the packet, the likelihood is increased that the sending node can route the packet through a network path with a satisfactory waveform quality as perceived by the participants in a call or session.

In accordance with the second of two illustrative embodiments of the present invention, an Internet Protocol (IP) source node at the edge of a telecommunications system—or some agent acting on behalf of the source node—exercises the capability to transmit a packet to any one of multiple gateways that bridge the local IP network to the Public Switched Telephone Network (PSTN) in the telecommunications system. Similarly, a gateway at the edge of the PSTN in the telecommunications system exercises the capability to connect to any other gateway at the edge of the PSTN. When a source node or agent has the option of sending a packet to one of multiple gateways, or a gateway has the option of connecting to one of multiple gateways across the PSTN, or both, the source node or agent can evaluate the waveform quality that is associated with the multiple paths between the source node and destination node, and can then intentionally choose an advantageous communication path for the packet. These options can reduce impairments in a telecommunications system where a gateway or PSTN communication path is a source of impairments, by selecting another gateway or communication path with better performance, as measured by the waveform quality. The result is that by providing the source node with more than one path to the destination node, the likelihood is increased that the source node can route the packet through a communication path with a satisfactory waveform quality as perceived by the participants in a call or session. The claims in the present application comprise aspects of the techniques that are embodied in this second illustrative embodiment.

The techniques of the illustrative embodiments select the utilized path in response to evaluating the waveform quality of the transmitted signals. However, it will be clear to those skilled in the art, after reading this specification, how to affect other call-related resources or functions in response to the evaluated waveform quality, such as muting or unmuting the media signal paths of a conference call by selectively disabling or re-enabling, respectively, the flow of packets. Furthermore, the techniques of the illustrative embodiments are in the context of a telecommunications system that comprises an Internet Protocol-based network. However, it will be clear to those skilled in the art, after reading this specification, how to apply the techniques to where other types of networks are present, such as networks that are asynchronous transfer mode (ATM) based or frame relay based, or based on some combination thereof.

It will also be clear to those skilled in the art that the indirect packet transmission method can use multiple relay nodes and, therefore, multiple indirections to transmit packets from the sending to receiving node. A collection of relay nodes can be logically interconnected in some topology, arbitrary or otherwise, and can use rules or policies, or both, for selecting logical interconnections. The resulting logical network is often referred to as an "overlay network" or "application-level network." Embodiments of the present invention encompass the use of one or more overlay networks for packet transmission, added to a preexisting packet-switched network, using network-level switching protocols (e.g., Ethernet, etc.) or internetwork-level routing protocols (e.g., Internet Protocol, etc.), or some combination thereof.

It will also be clear to those skilled in the art that the technique used in the first illustrative embodiment to respond to the waveform quality evaluations can be applied to the IP-based networks of the second illustrative embodiment, and conversely that the technique used in the second illustrative embodiment to respond to waveform quality evaluations can be applied to the PSTN subnetworks and gateways of the first illustrative embodiment.

An illustrative embodiment of the present invention comprises evaluating the waveform quality of media that is transmitted along a first communication path from a first node to a second node, wherein the first communication path traverses: (i) a first network that is packet-switched, (ii) a first gateway that is contiguous with the first network, and (iii) a second gateway that is non-contiguous with the first network; and when the waveform quality is unsatisfactory, transmitting a first packet along a second communication path from the first node to the second node, wherein the second communication path traverses the first network and at least one of: (i) a third gateway that is contiguous with the first network, and (ii) a fourth gateway that is non-contiguous with the first network; wherein the first communication path fails to provide a quality-of-service guarantee.

BRIEF DESCRIPTION OF THE DRAWINGS

FIG. 10 depicts a flowchart of the salient tasks associated with the operation of the second illustrative embodiment of the present invention.

DETAILED DESCRIPTION

Figure 1:
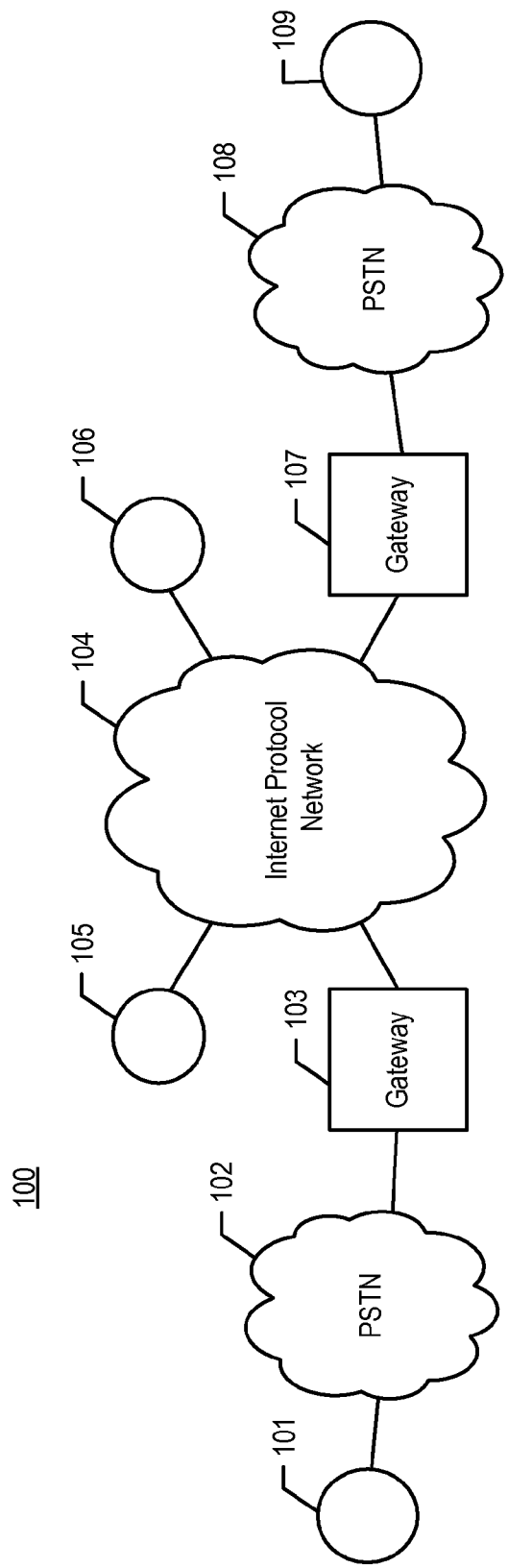
FIG. 1 depicts a schematic diagram of telecommunications system 100 in the prior art.

The following terms are defined for use in this Specification, including the appended claims:

The term "waveform quality," and its inflected forms, is defined as a measure of how well a media signal that is received at a device compares with what is required to be received at that device, when assessed at the waveform level. A media signal can be an audio signal, a video signal, a modem traffic signal, a TTY signal, a facsimile signal, or some other signal that can be characterized as having a waveform. The device can be the intended destination of the media signal within a telecommunications system or it can be an intermediate node within the telecommunications system. Waveform quality is distinguished from quality of service, which was defined earlier, in that quality of service is a measure that is performed at the packet level. Waveform quality is a function of, but is not limited to, one or more of the following waveform characteristics:
 i. loudness,
 ii. audio distortion,
 iii. noise,
 iv. fading,
 v. crosstalk,
 vi. echo, and
 vii. video distortion (e.g., spatial, temporal, optical, etc.).

The term "source node," and its inflected forms, is defined as the node in a telecommunications system that originates a media signal, in a particular call or session. The term "destination node," and its inflected forms, is defined as the node in a telecommunications system that is the intended recipient of the media signal, in the particular call or session.

A "communication path," and its inflected forms, is defined as the physical route between a source and destination node in a network. There can be more than one communication path between a pair of source and destination nodes.

The term "sending node," and its inflected forms, is defined as the node on the edge of a network that is part of a broader telecommunications system, where the node sends packets into the network (e.g., an Internet Protocol network, etc.). The term "receiving node," and its inflected forms, is defined as the node on the edge of the network, where the node receives packets from the network. Note that, for a given packet session, a sending node can also be a source node or a receiving node can also be a destination node, or both.

A "network path," and its inflected forms, is defined as the physical route between a sending and receiving node in a network. There can be more than one network path between a pair of sending and receiving nodes.

The term "relay node," and its inflected forms, is defined as an intermediate node that receives a packet and forwards at least part of that packet to the receiving node on the other end of the IP network. The address of the receiving node is part of the forwarding instructions that the relay node receives, either explicitly or implicitly.

This Specification comprises two illustrative embodiments. The first illustrative embodiment represents the present-invention technique of switching between network paths in a packet-switched network that is part of a first telecommunications system, and is described with respect to FIGS. 2 through 8. The second illustrative embodiment represents the present-invention technique of switching between communication paths that traverse different combinations of gateways in a second telecommunications system, and is described with respect to FIGS. 9 and 10. Both techniques use the waveform quality of media that is transmitted in packets along one or more paths, to determine which path or paths to use for future packet transmissions. As those who are skilled in the art will appreciate, after reading this Specification, the techniques can be used separately or can be combined. For example, the switching between networks paths (e.g., direct path, indirect paths, etc.) of the first illustrative embodiment can be used in combination with the switching between gateways of the second illustrative embodiment.

Figure 2:
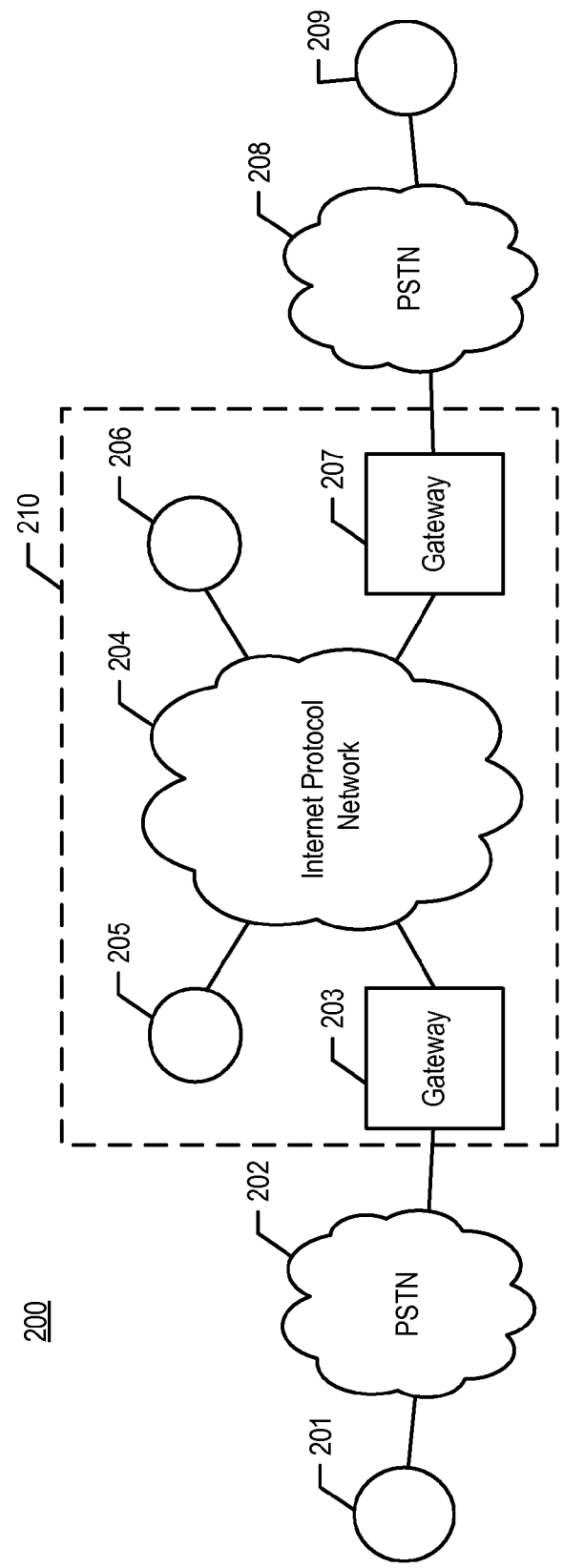
FIG. 2 depicts a schematic diagram of telecommunications system 200 in accordance with the first illustrative embodiment of the present invention.

In accordance with the first illustrative embodiment of the present invention, FIG. 2 depicts a schematic diagram of telecommunications system 200. System 200 comprises telephones 201 and 209, Public Switched Telephone Network (PSTN) subnetworks 202 and 208, Internet Protocol (IP) gateways 203 and 207, Internet Protocol network 204, and Internet Protocol endpoints 205 and 206, interconnected as shown. System 200 enables telephones 201 and 209 and endpoints 205 and 206, as well as other telecommunications terminals, to communicate with each other various kinds of media such as audio, video, and so forth.

The first illustrative embodiment is a hybrid telecommunications system that comprises portions of the Public Switched Telephone Network and an Internet Protocol-based network. As those who are skilled in the art will appreciate, after reading this specification, the technique of the present invention that is described with respect to FIGS. 2 through 8 can be applied to telecommunications systems that comprise other combinations of networks and of elements within those networks. As a first example, in some alternative embodiments, an enterprise network (circuit-switched or otherwise) with private branch exchange equipment can be present, instead of or in addition to one or both PSTN subnetworks 202 and 208. As a second example, in some alternative embodiments, Internet Protocol (IP) network 204 can be the public Internet or an enterprise IP network, instead of in addition to the service provider IP network depicted. Furthermore, as those who are skilled in the art will appreciate, the technique of the present invention described below can be applied to where nodes other than those depicted are present, such as media servers, voice or video messaging systems, interactive voice response (IVR) systems, and conferencing systems. The present invention is equally well suited for implementation in telecommunications systems that are private, public, or a combination of the two, as well as in telecommunications systems that are wireline, wireless, or a combination of the two.

Each of telephones 201 and 209 is an analog telecommunications terminal, as is known in the art, which is capable of making calls to or receiving calls from any other telecommunications terminal—PSTN-based or IP-based—in telecommunications system 200. In some alternative embodiments, one or both of telephones 201 and 209 are digital. It will be clear to those skilled in the art how to make and use telephones 201 and 209.

Public Switched Telephone Network subnetworks 202 and 208 are portions of the Public Switched Telephone Network (PSTN), which is well-known in the art. Subnetwork 202 comprises access paths, switches, and transmission paths, in a combination of analog and digital technology, which enable telephone 201 to communicate with other terminals. Subnetwork 208 also comprises access paths, switches, and transmission paths, in a combination of analog and digital technology, which enable telephone 209 to communicate with other terminals. Each depicted portion of the PSTN might comprise wireline equipment, wireless equipment, or both wireline and wireless equipment.

Internet Protocol gateways 203 and 207 are nodes that act as access points into Internet Protocol network 204 for signals from PSTN subnetworks 202 and 208, respectively. One or both of gateways 203 and 207 perform some or all of the tasks that are described below and with respect to FIG. 8, with or without the assistance of PSTN subnetworks 202 and 208.

Each of Internet Protocol endpoints 205 and 206 is a packet-capable telecommunications terminal that communicates via the Internet Protocol. Each endpoint is capable of making calls to or receiving calls from any other telecommunications terminal—PSTN-based or IP-based—in telecommunications system 200. Examples of an IP-based endpoint include a Session-Initiation Protocol (SIP) endpoint, an H.323 endpoint, a generic IP-based endpoint, and so forth. One or both of endpoints 205 and 206 perform some or all of the tasks that are described below and with respect to FIG. 8.

Internet Protocol network 204 is a packet-switched network that is capable of transporting packets between edge nodes (i.e., sending nodes and receiving nodes) by using the Internet Protocol, in well-known fashion. In some embodiments, network 204 is the Internet. Network 204, along with gateways 203 and 207 and endpoints 205 and 206, composes what is referred to in the specification as subsystem 210. In accordance with the first illustrative embodiment, the nodes in subsystem 210 interoperate by using the Internet Protocol. Nevertheless, it will be clear to those skilled in the art, after reading this disclosure, how to apply the present invention to telecommunications systems and subsystems that interoperate using an internetworking protocol other than or in addition or the Internet Protocol (e.g., asynchronous transfer mode, multiprotocol label switching [MPLS], etc.) and any of a variety of network or link products (e.g., Ethernet, SONET, frame relay, IEEE 802.11, etc.).

Figure 3:
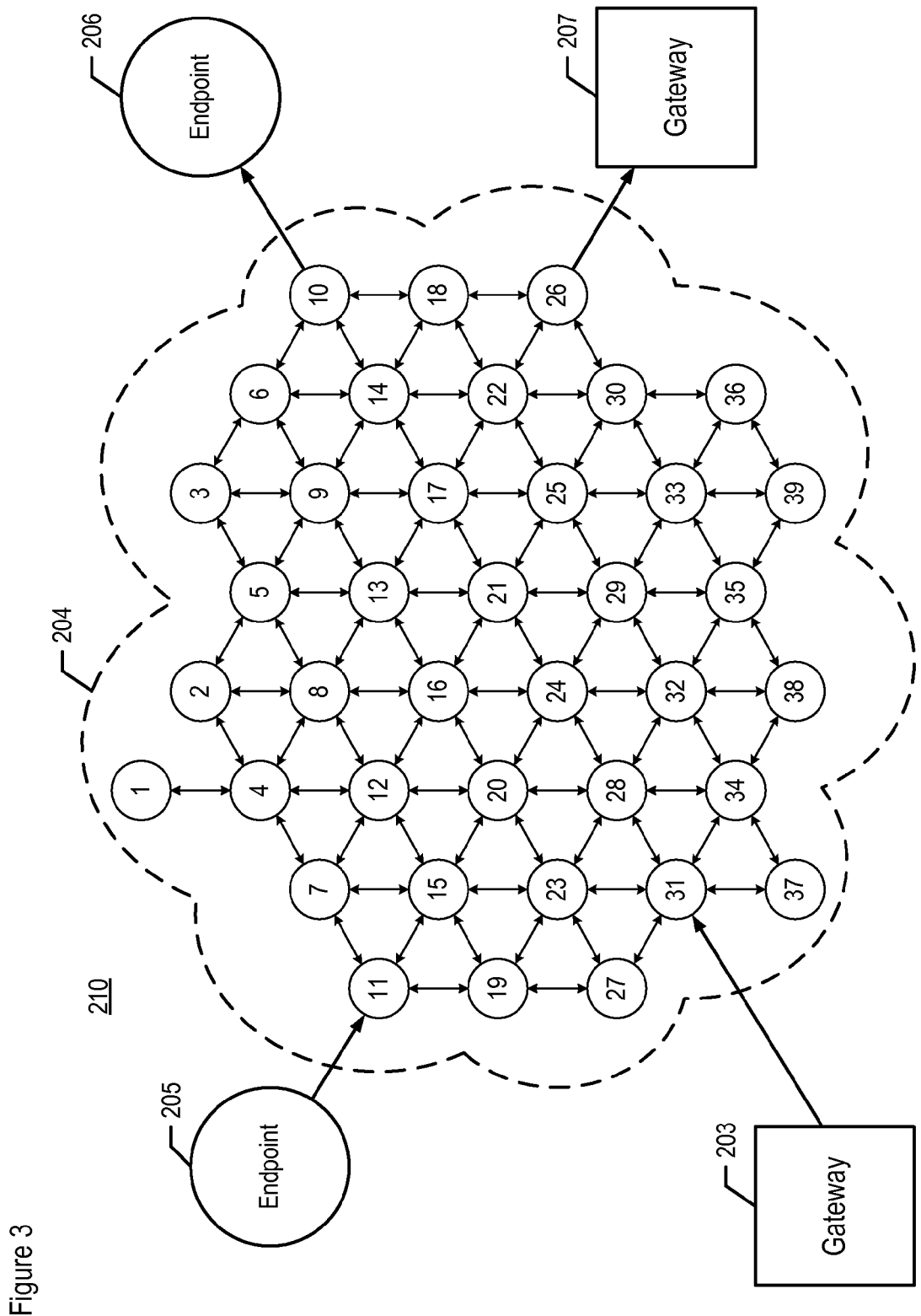
FIG. 3 depicts a schematic diagram of the salient components of subsystem 210, which is part of system 200.

FIG. 3 depicts a schematic diagram of the salient components of subsystem 210 in accordance with the first illustrative embodiment of the present invention. Subsystem 210 comprises gateway 203, endpoint 205, endpoint 206, gateway 207, and network 204, interconnected as shown. FIG. 3 also depicts the physical resources that compose network 204. As those who are skilled in the art will appreciate, in some alternative embodiments, a different configuration of physical resources might compose network 204.

In accordance with the first illustrative embodiment of the present invention, endpoint 205 is depicted as the sending node of traffic packets (e.g., media packets, control packets, etc.) that are transported through network 204, and gateway 207 is depicted as the receiving node of those traffic packets. However, it will be clear to those skilled in the art, after reading this specification, how to apply the present invention to other combinations of sending and receiving nodes (e.g., gateway 203 and endpoint 206, etc.). Furthermore, although not depicted for clarity purposes, gateways 203 and 207 are interconnected with PSTN subnetworks 202 and 208, respectively, and exchange signals with those PSTN subnetworks, as shown in FIG. 2.

Network 204 does not provide a waveform quality guarantee for the media (e.g., audio, video, etc.) that is transmitted in any packet or stream of packets such as Real-time Transport Protocol (RTP) packets, as known in the art, that network 204 transports—for example, from sending endpoint 205 to receiving gateway 207. Therefore, the provisioning of real-time services, such as streaming audio and telephony, from a source node to a destination node in telecommunications system 200, is problematic without the present invention. In accordance with the first illustrative embodiment, network 204 does, however, provide a quality-of-service guarantee to one or more packets or streams of packets that it transports. Still, in some alternative embodiments, as those who are skilled in the art will appreciate, network 204 might also not provide a quality-of-service guarantee to any packet or stream of packets that it transports.

Network 204 is a packet-switched, Internet Protocol-based network that comprises a plurality of nodes and their physical interconnections, which are arranged in the topology shown. It will be clear to those skilled in the art, however, after reading this specification, how to make and use alternative embodiments of the present invention with networks that comprise any number of nodes and have any topology. In particular, it will be clear to those skilled in the art, after reading this specification, how to make and use embodiments of the present invention with a type of packet-switched network other than one that is IP-based.

Each node in network 204 is capable of receiving a packet and of forwarding that packet to another node, in well-known fashion, based on the address of the receiving node in the packet. For example, when node 11 receives a packet from sending endpoint 205, which packet contains node 26 as its address, node 11 must decide which of its adjacent nodes—nodes 7, 15, and 19—to forward the packet to.

Each node in network 204 decides which adjacent node to give each packet to based on: (1) the address of the receiving node in the packet, and (2) a routing table in the node. Table 1 depicts an example of a routing table for node 11 in accordance with the first illustrative embodiment of the present invention. Note that the routing table for each node is, in general, different from node to node.

TABLE 1

| Routing Table for Node 11 | | | |
|---|---|---|---|
| Receiving Node Address | Preferred Next Node | First Alternative Next Node | Second Alternative Next Node |
| 1 | 7 | 15 | 19 |
| 2 | 7 | 15 | 19 |
| 3 | 7 | 15 | 19 |
| ... | ... | ... | ... |
| 26 | 15 | 7 | 19 |
| ... | ... | ... | ... |
| 37 | 19 | 15 | 7 |
| 38 | 19 | 15 | 7 |
| 39 | 19 | 15 | 7 |

When all of the resources in the network are functioning normally and there is little network congestion or other impairments, each node forwards a packet to the preferred next node listed in the routing table. For example, when node 11 receives a packet with the address 26, the preferred next node is node 15. Each node forwards a packet to the node listed as the entry for the preferred next node and the packet progresses from one preferred next node to the next and the next and so on until the packet reaches its receiving node. For the purposes of this specification, the "primary nominal path" is defined as the chain of preferred next nodes from a sending node to a receiving node.

In contrast, when the preferred next node is not functioning normally or there is congestion at the preferred next node or other known impairments, the routing node can alternatively route the packet to the first alternative next node. For example, the first alternative next node at node 11 for a packet with the address 26 is node 7. And when the first alternative node is not functioning or there is congestion at the first alternative next node, the routing node can route the packet to the second alternative next node. The second alternative next node at node 11 for a packet with the address 26 is node 19.

Figure 4:
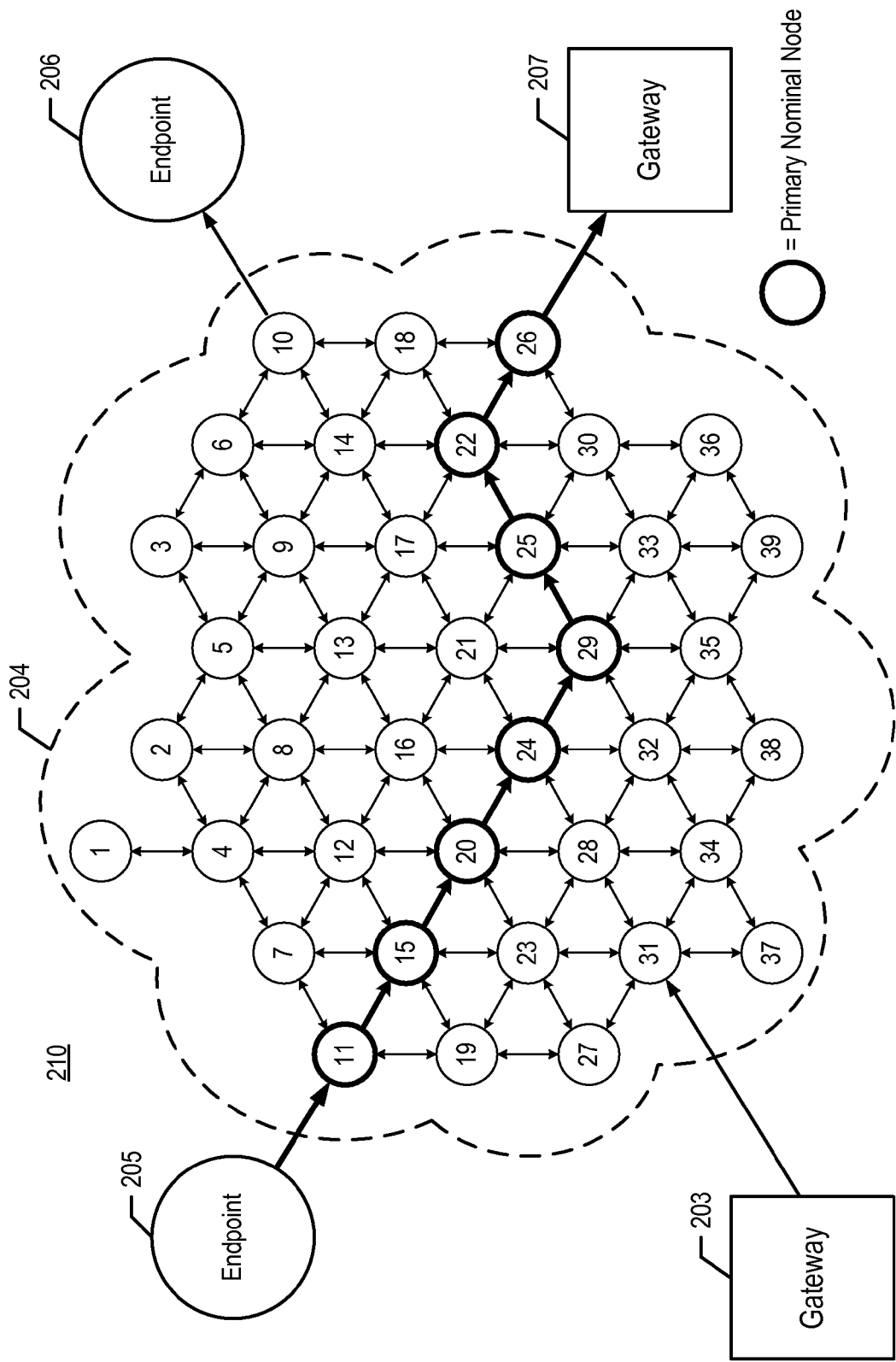
FIG. 4 depicts the primary nominal path through network 204 from sending endpoint 205 to receiving gateway 207, which elements compose subsystem 210 and which primary nominal path comprises nodes 11, 15, 20, 24, 29, 25, 22, and 26.

FIG. 4 depicts the primary nominal path through network 204 from sending endpoint 205 to receiving gateway 207, which comprises nodes 11, 15, 20, 24, 29, 25, 22, and 26. For any pair of sending and receiving nodes, there always exists one primary nominal path.

When any of the nodes in the primary nominal path are not functioning or are experiencing congestion, a node in the primary nominal path can divert the packet from the primary nominal path onto an "alternative nominal path." For the purposes of this specification, an "alternative nominal path" is defined as a chain of preferred and alternative next nodes from a sending node to a receiving node.

Figure 5:
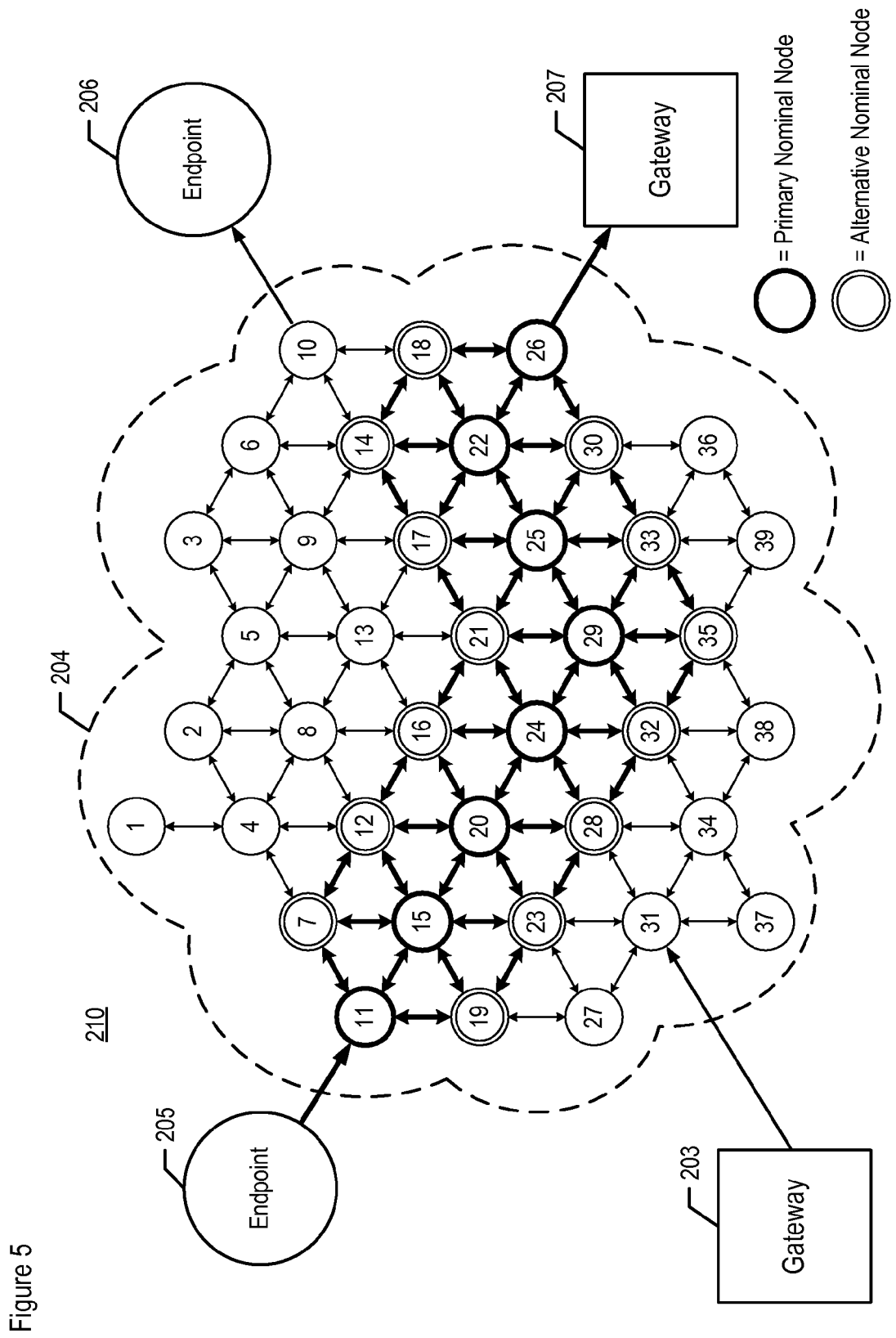
FIG. 5 depicts the primary nominal path and all of the alternative nominal paths through network 204 from sending endpoint 205 to receiving gateway 207.

FIG. 5 depicts the primary nominal path and all of the alternative nominal paths through network 204 from sending endpoint 205 to receiving gateway 207. For the purposes of this specification, a node in a network that is within the subgraph of nominal paths is defined as a "nominal path node" and a node that is not within the subgraph of nominal paths is defined as an "extranominal path node."

Network 204, in the prior art and without the advantage of the present invention, provides a degree of robustness within the subgraph of nominal paths with respect to quality of service metrics such as bandwidth, error rate, and latency—but not necessarily with respect to waveform quality metrics such as echo performance, noise performance, loudness performance, and so forth. In contrast, the first illustrative embodiment uses both nominal and extranominal path nodes to increase the likelihood that the waveform quality goals for media transmitted in one or more packets are achieved.

For the purposes of this specification, the term "indirect" path is defined as a path from a sending node to a receiving node through one or more specified relay nodes, regardless of whether each relay node is a nominal path node or not. Some, but not all, indirect paths are nominal paths. Conversely, and for the purposes of this specification, the term "direct" path is defined as a path from a sending node to a receiving node without a specified relay node. All direct paths are nominal paths.

Figure 6:
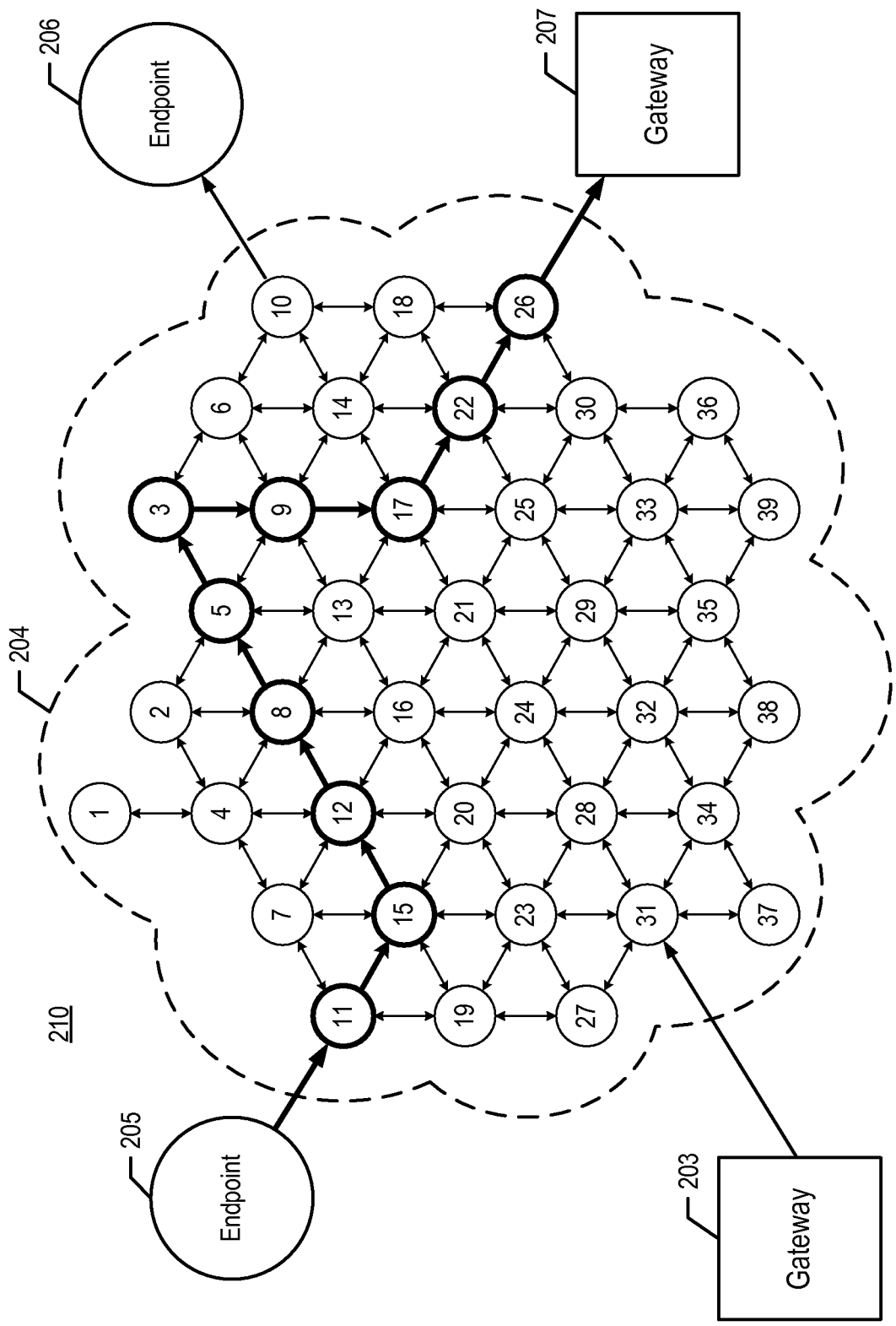
FIG. 6 depicts the use of extranominal path node 3 as a node for relaying a packet that leaves sending endpoint 205 to receiving gateway 207.

FIG. 6 depicts the use of extranominal path node 3 as a relay node for a packet that leaves sending endpoint 205 for receiving gateway 207. In this case, the packet takes a first path that is a nominal path (either primary or alternative) from sending endpoint 205 to node 3; the packet then takes a second path that is a nominal path (either primary or alternative) from node 3 to receiving gateway 207. The path from sending endpoint 205 to receiving gateway 207 through node 3 is indirect—in contrast to one of the direct, nominal paths from sending endpoint 205 to receiving gateway 207—because sending endpoint 205 specifies node 3 in the packet's path. In other words, when sending endpoint 205 specifies at least one relay node in the packet's path on its way to receiving gateway 207, the packet is taking an indirect path.

In accordance with the first illustrative embodiment of the present invention, extranominal path node 3 serves as the sole relay node for a packet that leaves sending endpoint 205 for receiving gateway 207. It will be clear, however, to those skilled in the art that the indirect packet transmission method of the first illustrative embodiment can use multiple relay nodes and, therefore, multiple indirections to transmit packets from the sending to receiving node. A collection of relay nodes can be logically interconnected in some topology and can use rules or policies, or both, for selecting logical interconnections. The resulting logical network is often referred to as an "overlay network" or "application-level network."

Figure 7:
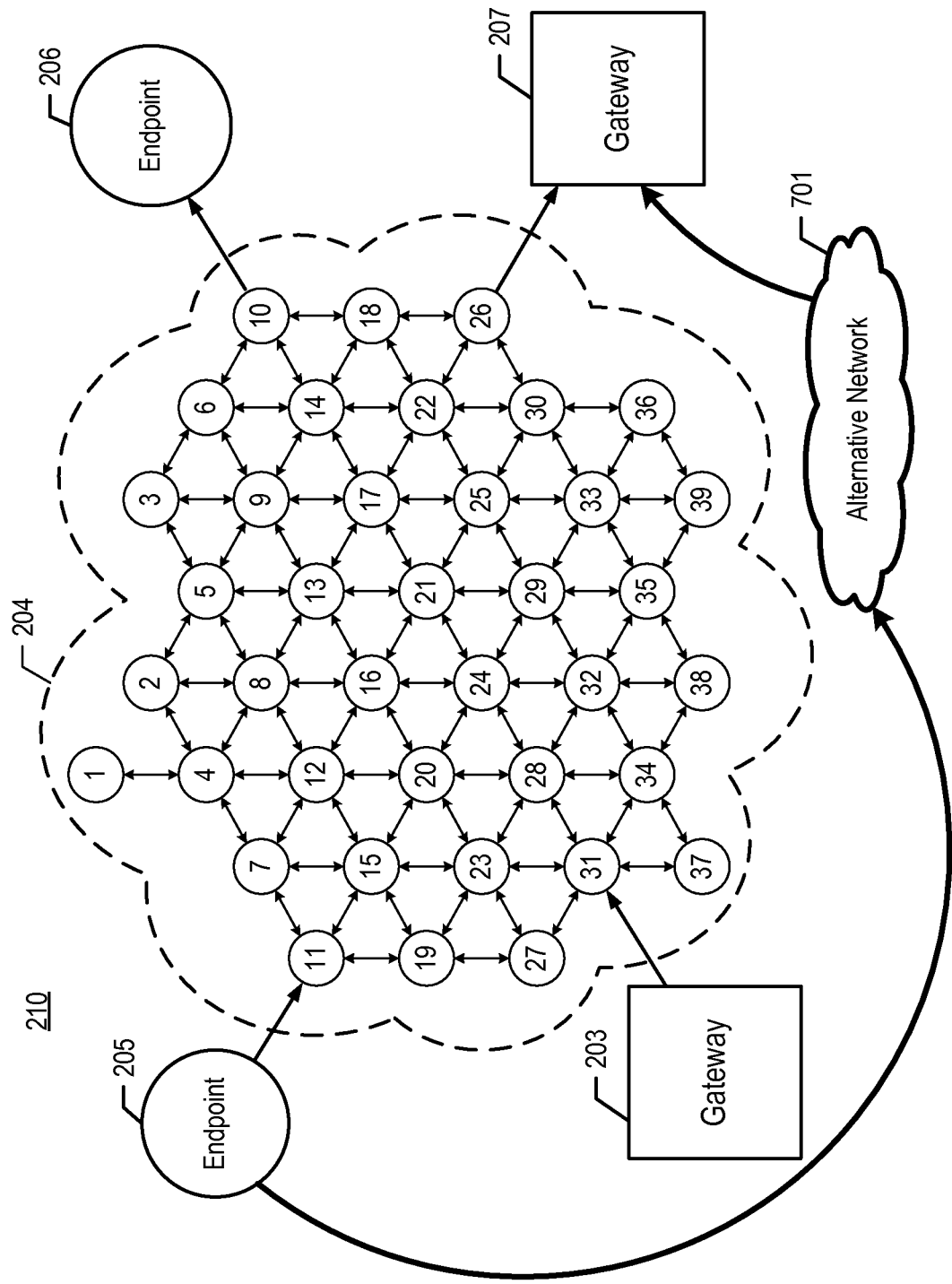
FIG. 7 depicts the use of extranominal, conditioned network 701 as a pathway for relaying a packet that leaves sending endpoint 205 for receiving gateway 207.

FIG. 7 depicts the use of extranominal, alternative network 701 as a pathway for relaying a packet that leaves sending endpoint 205 to receiving gateway 207. In accordance with the first illustrative embodiment, network 701 is conditioned to have waveform characteristics that are similar to or better than those of network 204. In some embodiments, network 701 comprises a portion of the Public Switched Telephone Network, one or more private networks, another IP network, or a network that operates in accordance with another protocol (e.g., ATM, frame relay, etc.). Network 701 is interconnected with other nodes of subsystem 210 as shown. In accordance with the first illustrative embodiment, network 701 is conditioned to provide a guaranteed, waveform quality of media that it transports. For example, network 701 can transport the media in packets from sending endpoint 205 to receiving gateway 207 with a waveform quality guarantee. A sending node such as sending endpoint 205 might select network 701 to transport at least some packets for applications that require the media in those packets to be received by the receiving node at a minimum waveform quality level or better. One example of a minimum waveform quality level is in audio telephony, in which the parties involved in a call will typically tolerate the presence of echo only up to, but not exceeding, a maximum delay such as 100 milliseconds. It will be clear to those skilled in the art how to make and use network 701 to provide a waveform quality guarantee.

FIGS. 6 and 7 depict scenarios in which sending endpoint 205 has specified a relay node within network 204 or a pathway that is external to network 204, such as through network 701. As those who are skilled in the art will appreciate, after reading this specification, changing the transmission path for a call or session, such as from a direct path to an indirect path, purely based on quality of service does not necessarily provide an improvement in waveform quality. For example, achieving a satisfactory packet delay between sending endpoint 205 and receiving gateway 207 might not necessarily result in a satisfactory echo characteristic for a call that involves the user of endpoint 205 and the user of telephone 209.

Figure 8:
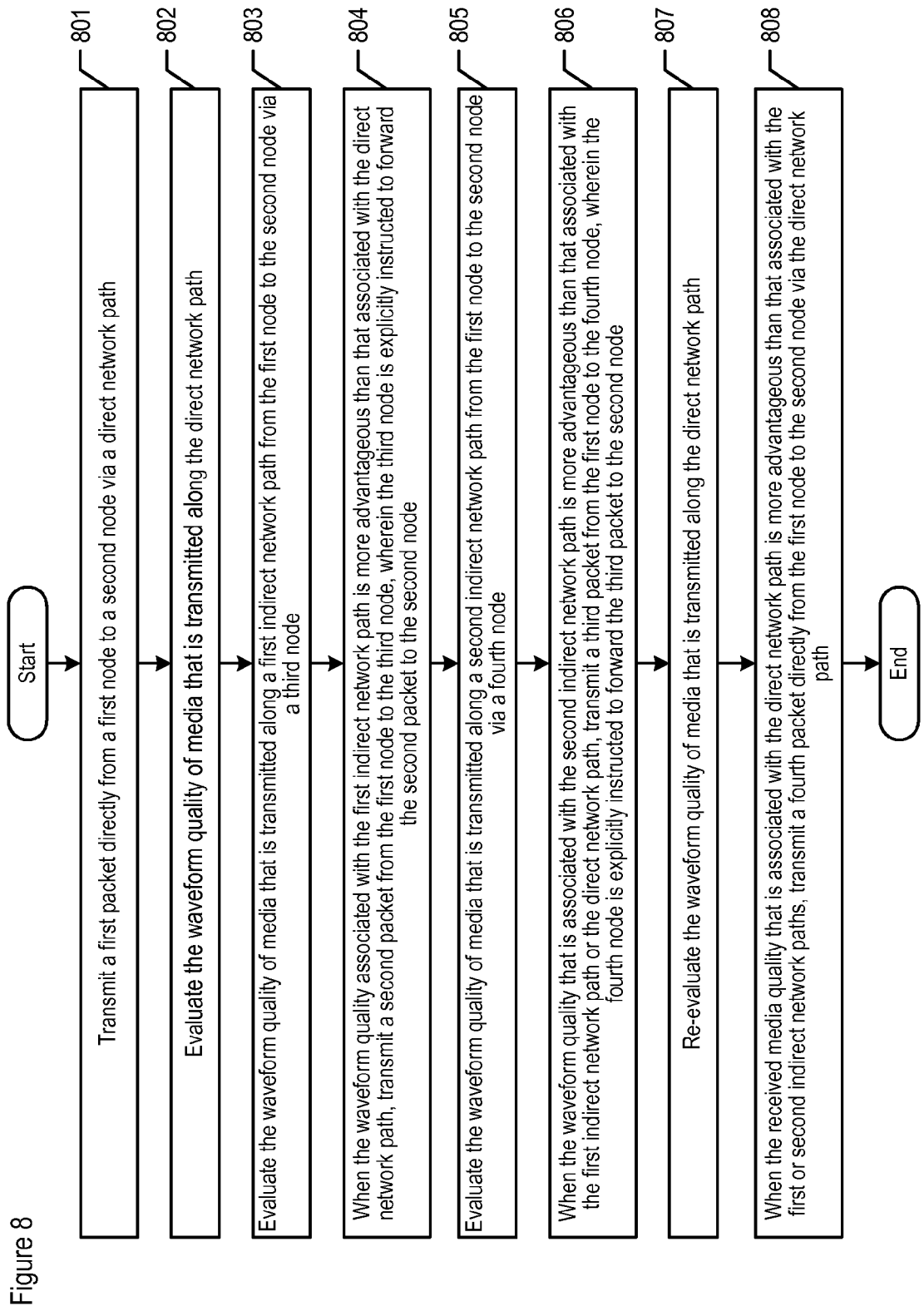
FIG. 8 depicts a flowchart of the salient tasks associated with the operation of the first illustrative embodiment of the present invention.

FIG. 8 depicts a flowchart of the salient tasks associated with the operation of the first illustrative embodiment of the present invention. In accordance with the first illustrative embodiment, telecommunications endpoint 205 evaluates the waveform quality of media that is transmitted along one or more network paths. As those who are skilled in the art will appreciate, in some alternative embodiments, a physically different node or another type of node, other than IP-based endpoint 205, either within or external to network 204, can perform some or all of the tasks that are described below.

As an example, FIG. 8 illustrates the transfer of packets from sending endpoint 205 to receiving gateway 207, where sending endpoint 205 is also the source node of the session and telephone 209 is the destination node of the session. Endpoint 205 and gateway 207 are used for illustrative purposes; however, it will be clear to those who are skilled in the art how to apply the present invention to the transmission of media between sending and receiving nodes different from those described in the example, and between source and destination nodes different from those described.

At task 801, sending endpoint 205 transmits a first packet to receiving gateway 207 through a direct path in well-known fashion.

At task 802, sending endpoint 205 evaluates the waveform quality of media that is transmitted along a direct path from sending endpoint 205 to receiving gateway 207. In evaluating the waveform quality, endpoint 205 compares one or more measurements that it receives against a pre-determined requirement. As is well known to those skilled in the art, the waveform quality that is associated with the direct path is measured by:

i. the loudness or intensity of the waveform,
  ii. the audio distortion that is present in the waveform,
  iii. the noise that is present in the waveform,
  iv. the fading that has occurred in the waveform,
  v. the crosstalk that is present in the waveform,
  vi. the echo that that is present in the waveform,
  vii. the video distortion that is present in the waveform (e.g., spatial, temporal, optical, etc.)
  viii. a derivative or associated function of one or more of i through vii, or
  ix. any combination of i through viii.

For example, sending endpoint 205 can evaluate the waveform quality associated with the direct path by transmitting, to receiving gateway 207, a test packet that comprises either an explicit or implicit instruction for gateway 207 to return one or more measurements to endpoint 205. Upon receiving the instruction, gateway 207 either measures internally or obtains an external measurement of the waveform of the media signal that is conveyed in one or more traffic packets received from sending endpoint 205. The measurement of a waveform can be taken at or in the proximity of gateway 207 or elsewhere in telecommunications system 200 (e.g., in PSTN subnetwork 208, in IP network 204, etc.). The measurement can be taken in the transmitted path—for example, to measure the loudness of the media signal—or can be taken in the return path—for example, to measure the echo from the media signal. Gateway 207 can perform this task alone or with one or more elements in PSTN subnetwork 208 to obtain one or more measurements of the waveform. Alternatively, another type of node other than a gateway can obtain the measurement on behalf of sending endpoint 205 or whichever node the evaluating node is. As those who are skilled in the art will appreciate, other techniques that are known in the art, such as PSTN-centric techniques, can be applied to measure the waveform quality of media that is transmitted along a direct path.

Furthermore, as those who are skilled in the art will appreciate, in some alternative embodiments, a node other than sending endpoint 205 can evaluate the waveform quality, such as receiving gateway 207—in which case, the evaluating node can return the results of the evaluation to endpoint 205, instead of or in addition to returning a measurement.

At task 803, sending endpoint 205 evaluates the waveform quality of media that is transmitted along a first indirect network path from sending endpoint 205 to receiving gateway 207 through node 3. In this case, node 3 is an extranominal node, but it will be clear to those skilled in the art how to make and use alternative embodiments of the present invention in which node 3 is a nominal path node.

Various techniques can be used to evaluate the waveform quality of a candidate path (e.g., through node 3, etc.), in which one or more measurements are compared against either a pre-determined requirement or against measurements associated with the path currently in use. As those who are skilled in the art will appreciate, other techniques than those described can be used to evaluate the waveform quality of media that is transmitted along a candidate path.

In a first illustrative technique, endpoint 205 can acquire saved measurements of waveforms of media that has been transmitted previously through endpoint 205, node 3, and gateway 207 to the same destination node (e.g., telephone 209, etc.).

In a second illustrative technique, endpoint 205 transmits a test waveform to a node in PSTN subnetwork 208 by encoding the waveform into a stream of test packets that are sent to node 3. The test packets further comprise an instruction for node 3 to forward the packets to receiving gateway 207 (and to forward the test waveform to PSTN subnetwork 208) with an instruction for receiving gateway 207. The instruction for gateway 207 is to return one or more measurements of the test waveform to sending endpoint 205, as measured either at gateway 207 or elsewhere such as in PSTN subnetwork 208. Gateway 207 can measure the waveform quality that is associated with a network path by applying various techniques that are known in the art, such as PSTN-centric techniques.

In a third illustrative technique, endpoint 205 temporarily routes the actual traffic packets of the media session through node 3, for the purpose of obtaining a measurement of the waveform quality. The traffic packets further comprise an instruction for node 3 to forward the packets to receiving gateway 207 with an instruction for receiving gateway 207, which instructs gateway 207 to return one or more measurements of the waveform to sending endpoint 205, as measured either at gateway 207 or elsewhere such as in PSTN subnetwork 208.

At task 804, when the waveform quality that is associated with the first indirect network path is more advantageous than that associated with the direct path, sending endpoint 205 transmits a second packet to node 3, wherein node 3 is explicitly instructed to forward the second packet to receiving gateway 207. It is well known to those skilled in the art how to instruct node 3 to forward the packet to receiving gateway 207. For example, the packet could itself carry a re-direct instruction as mentioned earlier or, as an alternative, sending endpoint 205 could transmit a signaling packet to node 3 to direct it to forward packets from endpoint 205 to receiving gateway 207.

In some alternative embodiments, sending endpoint 205 determines whether the waveform quality that is associated with the direct path is satisfactory—that is, exceeds predetermined requirements without accounting for the quality associated with other network paths—or unsatisfactory. This is in contrast to comparing the waveform quality associated with the first indirect path against the waveform quality that is associated with the direct path. In those embodiments, the evaluating of the waveform quality associated with the first indirect path can be skipped, and if the waveform quality is unsatisfactory, sending endpoint 205 transmits the second packet via the first indirect path through node 3.

At task 805, sending endpoint 205 evaluates the waveform quality of media that is transmitted along a second indirect path from sending endpoint 205 to receiving gateway 207 through yet another node such as node 32, for example. In this example, node 32 is a nominal path node, but it will be clear to those skilled in the art, after reading this specification, how to make and use alternative embodiments of the present invention in which the node in the evaluation is an extranominal path node. Sending endpoint 205 can evaluate the waveform quality associated with the path from sending endpoint 205 to receiving gateway 207 through node 32 in the same or a different manner from that described at task 803.

At task 806, when the waveform quality that is associated with the second indirect path (through node 32) is more advantageous than the waveform quality associated with the first indirect path (through node 3) or the direct path, sending endpoint 205 transmits a third packet from sending endpoint 205 to node 32, wherein node 32 is explicitly instructed to forward the second packet to receiving gateway 207. It is well known to those skilled in the art how to instruct node 32 to forward the packet to receiving gateway 207.

At task 807, sending endpoint 205 re-evaluates the waveform quality of media that is transmitted along a path from sending endpoint 205 to receiving gateway 207 through the direct path. Sending endpoint 205 can re-evaluate the waveform quality associated with the direct path in a similar manner or a different manner from how it evaluates the waveform at task 802 or 803.

At task 808, when the waveform quality that is associated with the direct network path is more advantageous than that of either the first or second indirect paths, sending endpoint 205 transmits a fourth packet from sending endpoint 205 to receiving gateway 207 through the direct path.

In some alternative embodiments, sending endpoint 205 determines whether the waveform quality that is associated with the direct path is satisfactory or unsatisfactory, instead of comparing the waveform quality associated with the first or second indirect paths with the waveform quality that is associated with the direct path. In those embodiments, if the waveform quality associated with the direct path is satisfactory, sending endpoint 205 transmits the fourth packet via the direct path.

Figure 9:
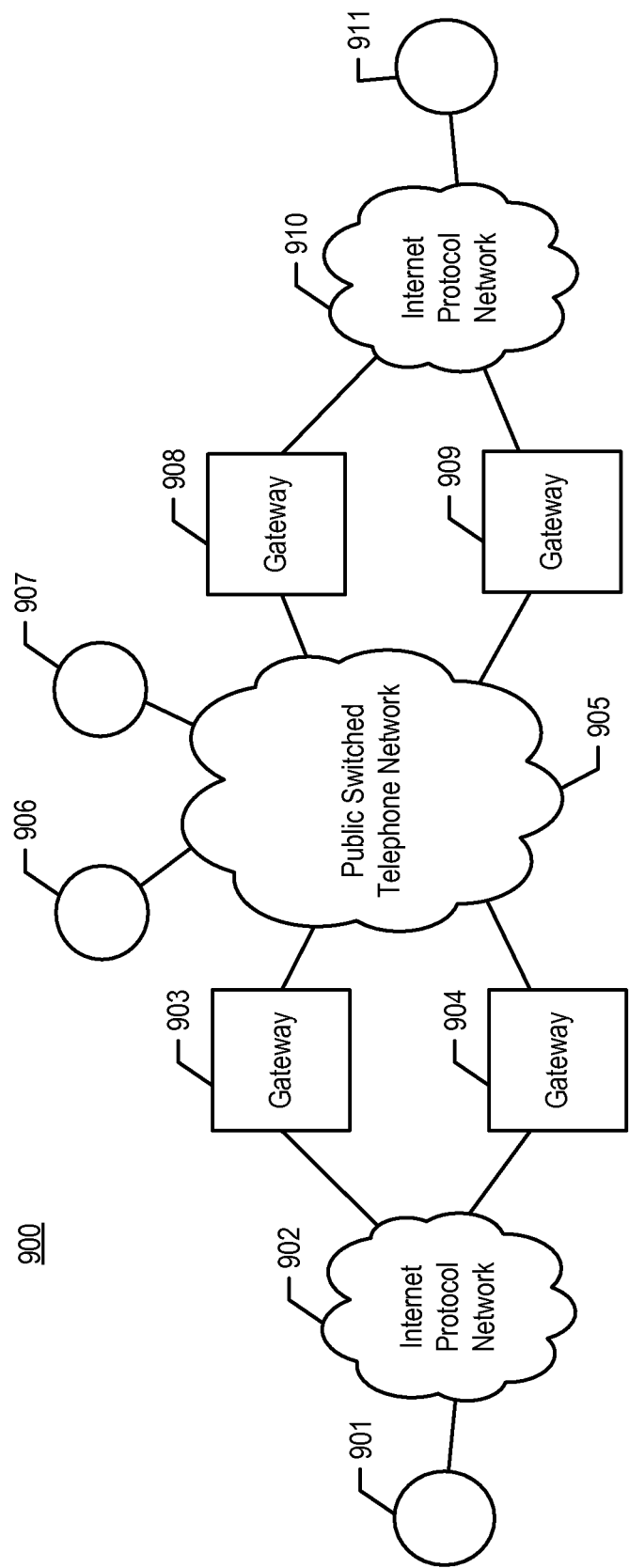
FIG. 9 depicts a schematic diagram of telecommunications system 900 in accordance with the second illustrative embodiment of the present invention.

In accordance with the second illustrative embodiment of the present invention, FIG. 9 depicts a schematic diagram of telecommunications system 900. System 900 comprises, interconnected as shown: Internet Protocol (IP) endpoints 901 and 911; IP networks 902 and 910; gateways 903, 904, 908, and 909; Public Switched Telephone Network 905; and telephones 906 and 907. System 900 enables IP endpoints 901 and 909 and telephones 906 and 907, as well as other telecommunications terminals, to communicate with each other various kinds of media such as audio, video, and so forth. A relevant property of system 900 is that any two communication instances between the same pair of IP endpoints or telephones can traverse different gateways. For example, in one instance, the media flow between IP endpoints 901 and 911 might traverse gateways 903 and 908; in another instance, the media flow between IP endpoints 901 and 911 might traverse gateways 904 and 909. Note that telecommunications system 900 does not provide a waveform quality guarantee for the media (e.g., audio, video, etc.) that is transmitted along at least some communication paths.

The second illustrative embodiment is a hybrid telecommunications system that comprises the Public Switched Telephone Network and multiple Internet Protocol-based networks. As those who are skilled in the art will appreciate, after reading this specification, the technique of the present invention that is described with respect to FIGS. 9 and 10 can be applied to telecommunications systems that comprise other combinations of networks and of elements within those networks. As a first example, in some alternative embodiments, an enterprise network (circuit-switched or otherwise) with private branch exchange equipment can be present, instead of or in addition to Public Switched Telephone Network 905. As a second example, in some alternative embodiments, one or both of Internet Protocol (IP) networks 902 and 910 can be the public Internet or enterprise IP networks, instead of in addition to the service provider IP networks depicted. Furthermore, as those who are skilled in the art will appreciate, the technique of the present invention described below can be applied to where nodes other than those depicted are present, such as media servers, voice or video messaging systems, interactive voice response (IVR) systems, and conferencing systems. The present invention is equally well suited for implementation in telecommunications systems that are private, public, or a combination of the two, as well as in telecommunications systems that are wireline, wireless, or a combination of the two.

Each of Internet Protocol endpoints 901 and 911 is a packet-capable telecommunications terminal that communicates via the Internet Protocol. Each endpoint is capable of making calls to or receiving calls from any other telecommunications terminal—PSTN-based or IP-based—in telecommunications system 900. Examples of an IP-based endpoint include a Session-Initiation Protocol (SIP) endpoint, an H.323 endpoint, a generic IP-based endpoint, and so forth. One or both of endpoints 901 and 911 perform some or all of the tasks that are described below and with respect to FIG. 10.

Each of Internet Protocol networks 902 and 910 is a packet-switched network that is capable of transporting packets between edge nodes (i.e., sending nodes and receiving nodes) by using the Internet Protocol, in well-known fashion. In some embodiments, one or both of networks 902 and 910 is the Internet. Each of networks 902 and 910 can comprise wireline equipment, wireless equipment, or both wireline and wireless equipment.

In accordance with the second illustrative embodiment, the nodes that constitute each of networks 902 and 910 interoperate by using the Internet Protocol. However, it will be clear to those skilled in the art, after reading this disclosure, how to apply the present invention to telecommunications systems and subsystems that interoperate using an internetworking protocol other than or in addition or the Internet Protocol (e.g., asynchronous transfer mode, multiprotocol label switching [MPLS], etc.) and any of a variety of network or link products (e.g., Ethernet, SONET, frame relay, IEEE 802.11, etc.).

Internet Protocol gateways 903 and 904 are nodes that act as access points into Internet Protocol network 902 for signals from PSTN 905 and, as such, are contiguous with network 902, but are non-contiguous with network 910. Gateways 908 and 909 act as access points into network 910 for signals from PSTN 905 and, as such, are contiguous with network 910, but are non contiguous with network 902.

Public Switched Telephone Network 905, as is well-known in the art, comprises access paths, switches, and transmission paths, in a combination of analog and digital technology, which enable telephones 906 and 907 to communicate with other terminals. Telephones 906 and 907 are telecommunications terminals that are capable of making calls to or receiving calls from any other terminal in system 900. PSTN 905 can comprise wireline equipment, wireless equipment, or both wireline and wireless equipment.

FIG. 10 depicts a flowchart of the salient tasks associated with the operation of the second illustrative embodiment of the present invention. In accordance with the second illustrative embodiment, telecommunications endpoint 901 evaluates the waveform quality of media that is transmitted along one or more communication paths. As those who are skilled in the art will appreciate, in some alternative embodiments, a physically different node or another type of node, other than IP-based endpoint 901, either within or external to network 902, can perform some or all of the tasks that are described below.

As an example, FIG. 10 illustrates the transfer of packets from source endpoint 901 to destination endpoint 911 along one or more communication paths that traverse network 902. Endpoints 901 and 911 are used for illustrative purposes; however, it will be clear to those who are skilled in the art how to apply the present invention to the transmission of media between source and destination nodes different from those described in the example. In addition to traversing network 902, the communication paths traverse gateways x and y, where gateway x is gateway 903 or gateway 904 as depicted, and gateway y is gateway 908 or gateway 909 as depicted. It will also be clear to those skilled in the art how to apply the present invention when the number of gateways, and therefore the paths between them, is different from that used in the example.

At task 1001, source endpoint 901 transmits a first packet to destination endpoint 911 through a first communication path in well-known fashion. In the example, the first communication path traverses network 902, gateway 903, and gateway 908.

At task 1002, source endpoint 901 evaluates the waveform quality of media that is transmitted along the first communication path. In evaluating the waveform quality, endpoint 901 compares one or more measurements that it receives against a pre-determined requirement. As is well known to those skilled in the art, the waveform quality that is associated with the first communication path is measured by:

i. the loudness or intensity of the waveform,
   ii. the audio distortion that is present in the waveform,
   iii. the noise that is present in the waveform,
   iv. the fading that has occurred in the waveform,
   v. the crosstalk that is present in the waveform,
   vi. the echo that that is present in the waveform,
   vii. the video distortion that is present in the waveform (e.g., spatial, temporal, optical, etc.)
   viii. a derivative or associated function of one or more of i through vii, or
   ix. any combination of i through viii.

Sending endpoint 901 evaluates the waveform quality of media in this second illustrative embodiment similarly to how endpoint 205 evaluates the waveform quality in the first illustrative embodiment, as described above and with respect to task 802.

As those who are skilled in the art will appreciate, in some alternative embodiments a node other than source endpoint 901 can evaluate the waveform quality, such as destination endpoint 911—in which case, the evaluating node can return the results of the evaluation to endpoint 901, instead of or in addition to returning a measurement.

At task 1003, source endpoint 901 evaluates the waveform quality of media that is transmitted along a second communication path from source endpoint 901 to destination endpoint 911. In the example, the second communication path traverses network 902, gateway 904, and gateway 908. In some embodiments, endpoint 901 also evaluates the waveform quality of media that is transmitted along other communication paths (e.g., through gateways 904 and 909, through gateways 903 and 909, etc.).

Various techniques can be used to evaluate the waveform quality of a candidate path (e.g., through gateway 904, through gateway 909, etc.), in which one or more measurements are compared against either a pre-determined requirement or against measurements associated with the path currently in use. As those who are skilled in the art will appreciate, other techniques than those described can be used to evaluate the waveform quality of media that is transmitted along a candidate path. Some illustrative techniques are described above and with respect to task 803; those who are skilled in the art will appreciate, after reading this specification, how to apply those techniques here.

At task 1004, when the waveform quality that is associated with the second communication path, or with some other evaluated path, is more advantageous than that associated with the first communication path, source endpoint 901 transmits a second packet to endpoint 911 along the path with the more advantageous waveform quality. For example, if the second communication path is selected, source endpoint 901 transmits the packet to gateway 904, gateway 904 transmits the media information contained in the packet along a path to gateway 908, and gateway 908 re-packetizes the media information and transmits the packet to endpoint 911, in well-known fashion.

In some alternative embodiments, source endpoint 901 determines whether the waveform quality that is associated with the first communication path is satisfactory—that is, exceeds pre-determined requirements without accounting for the quality associated with other communication paths—or unsatisfactory. This is in contrast to comparing the waveform quality associated with other communication paths against the waveform quality that is associated with the first communication path. In those embodiments, the evaluating of the waveform quality associated with the second communication path can be skipped, and if the waveform quality is unsatisfactory, source endpoint 901 transmits the second packet via the second communication path.

At task 1005, sending endpoint 205 evaluates the waveform quality of media that is transmitted along a third communication path from source endpoint 901 to destination node 911. In the example, the third communication path traverses network 902, gateway 904, and gateway 909. In some embodiments, endpoint 901 also evaluates the waveform quality of media that is transmitted along other communication paths (e.g., through gateways 903 and 908, through gateways 903 and 909, etc.). Source endpoint 901 can evaluate the waveform quality associated with the third communication path in the same or a different manner from that described at task 1003.

At task 1006, when the waveform quality that is associated with the third communication path is more advantageous than the waveform quality associated with the second communication path (or other evaluated communication paths), source endpoint 901 transmits a third packet to destination endpoint 911 along the third communication path.

At task 1007, source endpoint 901 re-evaluates the waveform quality of media that is transmitted along the first communication path. Endpoint 901 can re-evaluate the waveform quality associated with the first communication path in a similar manner or a different manner from how it evaluates the waveform at task 1002 or 1003.

At task 1008, when the waveform quality that is associated with the first communication path is more advantageous than that of the second or third communication path, source endpoint 901 transmits a fourth packet to destination endpoint 911 along the first communication path.

The examples described with respect to FIGS. 8 and 10 change the utilized path in response to evaluating the waveform quality of the transmitted signals. However, it will be clear to those skilled in the art, after reading this specification, how to affect other call-related resources or characteristics in response to the evaluated waveform quality. For example, the techniques of the illustrative embodiments can be applied to controlling echo that is transmitted in a return path of a call by selectively disabling or re-enabling the flow of packets through the packet-switched network, in order to mute or unmute, respectively, the signals that contain the echo.

It is to be understood that the above-described embodiments are merely illustrative of the present invention and that many variations of the above-described embodiments can be devised by those skilled in the art without departing from the scope of the invention. For example, in this specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:

evaluating, by a first endpoint, the waveform quality of a media signal that is transmitted by the first endpoint along a first communication path from a first node to a second node, wherein the first communication path traverses: (i) a first network that is packet-switched, (ii) a first gateway that is contiguous with the first network, and (iii) a second gateway that is non-contiguous with the first network;

when the waveform quality is determined to be unsatisfactory regardless of a quality-of-service of the first communication path, transmitting, by the first endpoint a first packet along a second communication path from the first node to the second node, wherein the second communication path traverses the first network and at least one of: (i) a third gateway that is contiguous with the first network, and (ii) a fourth gateway that is non-contiguous with the first network;

wherein the first communication path fails to provide a quality-of-service guarantee;

wherein the evaluating comprises (i) receiving from the first gateway a measurement of the waveform quality of the media signal, and (ii) comparing the measurement to a predetermined requirement to determine whether the waveform quality is satisfactory or unsatisfactory;

evaluating the waveform quality of media that is transmitted along a third communication path from the first node to the second node, wherein the third communication path traverses the first network and at least one of the third gateway and the fourth gateway;

when the waveform quality of media transmitted along the third communication path is more advantageous than the waveform quality of media transmitted along the second communication path, transmitting a second packet along the third communication path from the first node to the second node;

wherein the third communication path fails to provide a quality-of-service guarantee;

re-evaluating the waveform quality of media that is transmitted along the first communication path from the first node to the second node; and when the waveform quality of media transmitted along the first communication path is satisfactory, transmitting a third packet along the first communication path from the first node to the second node.

2. The method of claim 1 wherein the first gateway and the second gateway are contiguous with a second network, and wherein the communication protocols of the first network and the second network are different.

3. The method of claim 2 wherein the second network is the Public Switched Telephone Network.

4. The method of claim 2 wherein the first network is Internet Protocol-based.

5. The method of claim 1 wherein the evaluating is based on the quality of service of the first communication path being satisfactory.

6. The method of claim 1 wherein the evaluating of the waveform quality of the media signal that is transmitted along the first communication path is performed with respect to one or more of echo, noise, loudness, and audio distortion.

7. The method of claim 1 wherein the evaluating of the waveform quality of the media signal that is transmitted along the first communication path is performed with respect to one or more of fading, crosstalk, and video distortion.

8. A method comprising:
- transmitting by a first endpoint a first packet along a first communication path from the first node to the second node, wherein the first communication path traverses: (i) a first network that is packet-switched, (ii) a first gateway that is contiguous with the first network, and (iii) a second gateway that is non-contiguous with the first network;
- evaluating the waveform quality of a media signal that is transmitted by the first endpoint along the first communication path;
- evaluating the waveform quality of the media signal that is transmitted by the first endpoint along a second communication path from the first node to the second node, wherein the second communication path traverses the first network and at least one of: (i) a third gateway that is contiguous with the first network, and (ii) a fourth gateway that is non-contiguous with the first network;
- when the waveform quality of the media signal that is transmitted along the second communication path is more advantageous than the waveform quality of the media that is transmitted along the first communication path, transmitting a second packet along the second communication path from the first node to the second node;
- wherein the second communication path fails to provide a quality-of-service guarantee;
- wherein (i) the evaluating associated with the first communication path and (ii) the evaluating associated with the second communication path are both based on the quality-of-service of the first communication path being satisfactory;
- evaluating the waveform quality of media that is transmitted along a third communication path from the first node to the second node, wherein the third communication path traverses the first network and at least one of the third gateway and the fourth gateway;
- when the waveform quality of media transmitted along the third communication path is more advantageous than the waveform quality of media transmitted along the second communication path, transmitting a third packet along the third communication path from the first node to the second node;
- wherein the third communication path fails to provide a quality-of-service guarantee;
- re-evaluating the waveform quality of media that is transmitted along the first communication path from the first node to the second node; and
- when the waveform quality of media transmitted along the first communication path is satisfactory, transmitting a fourth packet along the first communication path from the first node to the second node.

9. The method of claim 8 wherein the first gateway and the second gateway are contiguous with a second network, wherein the communication protocols of the first network and the second network are different.

10. The method of claim 9 wherein the second network is the Public Switched Telephone Network.

11. The method of claim 9 wherein the first network is Internet Protocol-based.

12. The method of claim 8 wherein the evaluating of the waveform quality of media that is transmitted along the first communication path is performed with respect to one or more of echo, noise, loudness, and audio distortion.

13. The method of claim 8 wherein the evaluating of the waveform quality of media that is transmitted along the first communication path is performed with respect to one or more of fading, crosstalk, and video distortion.

14. A method comprising:
- transmitting, by a first endpoint, a first packet along a first communication path from a first node to a second node, wherein the first communication path traverses: (i) a first network that is packet-switched, (ii) a first gateway that is contiguous with the first network, and (iii) a second gateway that is non-contiguous with the first network;
- evaluating the waveform quality of a media signal that is transmitted along the first communication path, along a second communication path from the first node to the second node, and along a third communication path from the first node to the second node, wherein the second communication path and the third communication path are different, and wherein each of the second communication path and the third communication path traverses the first network and at least one of: (i) a third gateway that is contiguous with the first network, and (ii) a fourth gateway that is non-contiguous with the first network;
- when the waveform quality of the media signal that is transmitted along the second communication path is determined to be more advantageous than both (i) the waveform quality of the media signal that is transmitted along first communication path and (ii) the waveform quality of the media signal that is transmitted along the third communication path, transmitting a second packet along the second communication path from the first node to the second node;
- wherein the second communication path fails to provide a quality-of-service guarantee;
- wherein the determination of whether the waveform quality of the media signal along the second communication path is more advantageous is based on a quality-of-service of the second communication path being satisfactory;
- when the waveform quality of media transmitted along the third communication path is more advantageous than the waveform quality of media transmitted along the second communication path, transmitting a third packet along the third communication path from the first node to the second node;
- wherein the third communication path fails to provide a quality-of-service guarantee;
- re-evaluating the waveform quality of media that is transmitted along the first communication path from the first node to the second node; and
- when the waveform quality of media transmitted along the first communication path is satisfactory, transmitting a fourth packet along the first communication path from the first node to the second node.

15. The method of claim 14 wherein the first gateway and the second gateway are contiguous with a second network, wherein the communication protocols of the first network and the second network are different.

16. The method of claim 15 wherein the second network is the Public Switched Telephone Network.

17. The method of claim 15 wherein the first network is Internet Protocol-based.

18. The method of claim 14 wherein the evaluating of the waveform quality of media that is transmitted along the first communication path is performed with respect to one or more of echo, noise, loudness, and audio distortion.

19. The method of claim 14 wherein the evaluating of the waveform quality of media that is transmitted along the first communication path is performed with respect to one or more of fading, crosstalk, and video distortion.

* * * * *